United States Patent
Cryderman

(10) Patent No.: US 8,521,135 B2
(45) Date of Patent: Aug. 27, 2013

(54) MESSAGE RELAY HOST FOR DELIVERING MESSAGES TO OUT OF COVERAGE COMMUNICATIONS DEVICES

(75) Inventor: Aaron Cryderman, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 221 days.

(21) Appl. No.: 12/973,464

(22) Filed: Dec. 20, 2010

(65) Prior Publication Data

US 2012/0157097 A1  Jun. 21, 2012

(51) Int. Cl.
*H04L 12/58* (2006.01)

(52) U.S. Cl.
USPC ............. 455/412.1; 455/41.2; 455/414.2; 455/422.1; 370/285; 370/312; 370/331; 370/338

(58) Field of Classification Search
USPC .......... 455/41.2, 414.2, 412.1, 422; 370/312, 370/285, 331, 338
See application file for complete search history.

(56) References Cited

U.S. PATENT DOCUMENTS

| 6,580,981 B1 | 6/2003 | Masood et al. |
| 2008/0313284 A1 | 12/2008 | Doyle |

FOREIGN PATENT DOCUMENTS

| EP | 1802044 A1 | 6/2007 |
| EP | 1802044 A1 * | 6/2007 |
| WO | WO 0237771 A2 * | 5/2002 |
| WO | WO0237771 A2 | 5/2002 |

OTHER PUBLICATIONS

Cryderman, Aaron, U.S. Appl. No. 12/533,125, filed Jul. 31, 2009.
Partial Search Report dated May 27, 2011 for EP10196054.
Extended European Search Report dated Sep. 27, 2011 for EP10196054.

* cited by examiner

*Primary Examiner* — Wayne Cai
*Assistant Examiner* — Chuck Huynh
(74) *Attorney, Agent, or Firm* — Jeffrey N. Giunta; Fleit Gibbons Gutman Bongini & Bianco PL

(57) ABSTRACT

System and method for delivering messages to devices not in communication with a transmitting server. One or more wireless devices serve as host devices to relay a message from the server to the target device that is not in communication with the server. The server sends the message to host devices when they are in communication with the server. The host device or devices store the message to be relayed to the target device. When the host device is close to the target device, it establishes a short range wireless link with the target device and transmits the message to the target device. In an example, the messages sent to and stored by the host device are encrypted so they are not able to be read by a user of the host device.

19 Claims, 9 Drawing Sheets

| | 302 | 304 | 306 | 308 → 300 |
|---|---|---|---|---|
| | TARGET ID | HOST ID | ELAPSED TIME | ENCOUNTER DATE/TIME |
| 320 | 1 | 2 | 55 | Apr 1, 2010 1:09 pm |
| 322 | 1 | 2 | 109 | Apr 3, 2010 11:01 am |
| 324 | 1 | 3 | 12 | Apr 4, 2010 3:07 pm |
| 326 | 1 | 2 | 15 | Apr 5, 2010 6:44 am |
| 328 | 1 | 4 | 18 | Apr 1, 2010 8:53 am |
| 330 | 10 | 2 | 11 | Apr 5, 2010 3:09 pm |
| 332 | 10 | 3 | 15 | Apr 5, 2010 3:53 pm |

FIG. 3

MESSAGE RELAY HOST FOR DELIVERING MESSAGES TO OUT OF COVERAGE COMMUNICATIONS DEVICES

FIELD OF THE DISCLOSURE

The present disclosure generally relates to wireless communication and more particularly to relaying messages through devices via at least one short range wireless link.

BACKGROUND

Mobile communication devices exchange data, such as text messages and e-mails, with messaging servers over long range wireless data links or over long range communication links that consist of shorter range wireless links, such as Wi-Fi hot spots accessing the Internet. An example of wireless data communication links through which wireless communication devices communicate with base stations include cellular-like data networks. When a wireless data communication link is not available to the mobile device, messages addressed to that mobile device are generally held by the messaging server until the mobile device regains communication with the messaging server. In some instances, a mobile device may be out of wireless data communication coverage for some time, and the user of that device will not be able to receive messages addressed to him or her. The effectiveness of mobile communication devices can be affected by the ready availability of wireless communication links.

Therefore, the effectiveness of wireless message communication is limited by periods during which mobile devices are not in communication with messaging servers, and therefore cannot receive messages.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 is a messaging relay association list as maintained by a messaging server depicted in FIG. 1, in accordance with one example;

DETAILED DESCRIPTION

Figure 1:
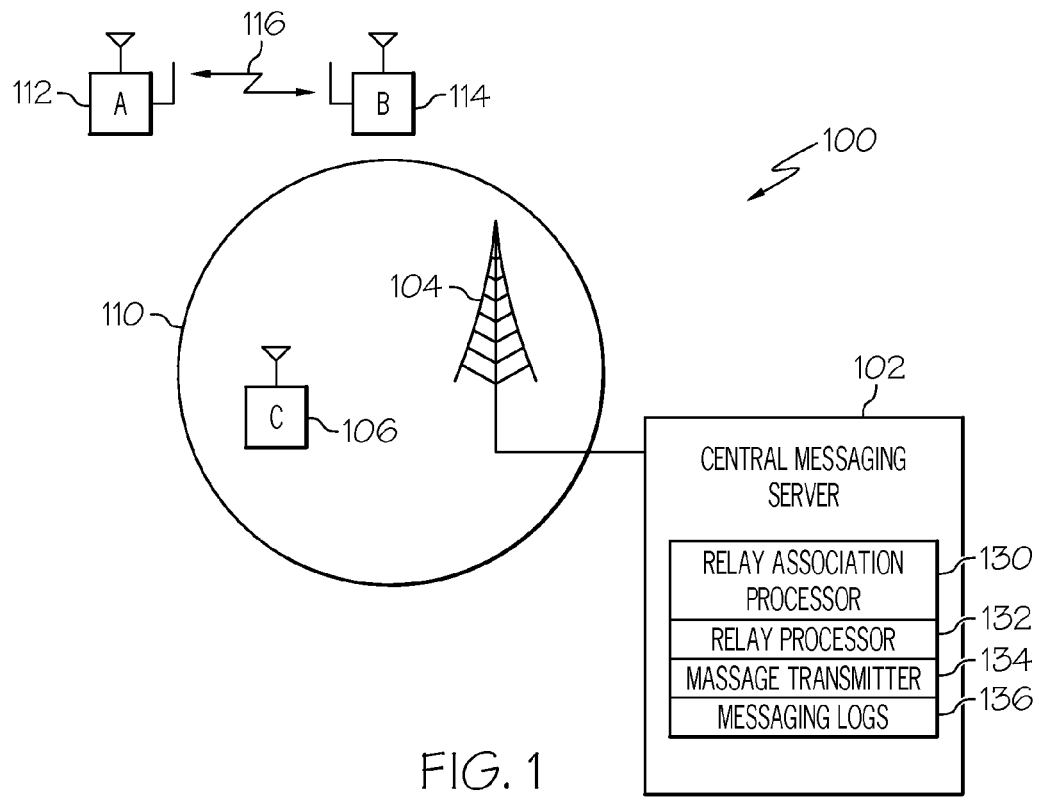
FIG. 1 illustrates a wireless communication coverage map in accordance with one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

In the following discussion, the term "message" is used broadly and includes any data being sent from one electronic device to another. Examples of messages include, but are not limited to, e-mail messages, calendar synchronization data, contact symbolization data, instant messaging messages and the like.

Described below are systems and methods that extend message delivery to electronic devices that are not currently in data communication with a messaging server. In one example, a messaging server has a data message to send to a target wireless communication device that is not currently in data communication with that messaging server. In this example, one or more other wireless communication devices serve as hosts or carrier devices to relay the message from the messaging server to the target device. When these one or more host wireless communication devices are in data communication with the messaging server, the messaging server sends the message to one or more host wireless communication devices. These one or more devices then receive and store the message to be relayed to the target device from the messaging server. When a host device is sufficiently close to the target wireless communication device, the host device establishes a short range wireless link with the target wireless communication device and transmits the message to the target wireless communication device. In an example, the messages sent to and stored by the host electronic device are encrypted so they are not able to be read by a user of the host electronic device.

One example of an application of these systems and methods includes a scenario where a cellular data communication base station on the outskirts of a city becomes inoperable and creates a wireless data blackout zone. Office workers in the blackout zone can no longer receive emails on their wireless communication devices. Some workers live near the office and consequently their homes and office have no wireless coverage. In this example, another worker from the same office commutes to work every day from a more distant home and has wireless data communication coverage for most of his journey into the office. While commuting to work, this other worker's wireless communication device receives encrypted emails for the workers who live and work in the blackout area. This other worker's wireless communication device acts as a message host or carrier for the workers who are in the blackout area. When the commuting worker arrives in the office, his or her wireless communication device transmits, via short range wireless communication, such as via a Bluetooth® connection, the hosted messages to the devices of the workers who remained in the blackout area.

The following describes systems and methods used to establish messaging relay associations that are used to determine which wireless communication devices should be used as host or carrier electronic devices to receive and relay messages that are addressed to particular target electronic devices. Selectively identifying and prioritizing wireless communication devices to be used as host devices for particular target devices is used in some examples to reduce overall resource consumption. For example, if fewer than all eligible host devices are sent copies of each message to be delivered to one target device, the number of messages each host device receives and is required to store is reduced. Further, wireless communication resources are also conserved, resulting in more efficient wireless bandwidth utilization and reductions in power pack energy consumption for the mobile relay devices.

FIG. 1 illustrates a wireless communication coverage map 100 in accordance with one example. The wireless communication coverage map 100 depicts one wireless communication base station 104 that communicates wirelessly with a number of wireless communication devices. The wireless communication base station 104 has a wireless coverage area 110. Wireless communication devices within the wireless coverage area 110 are able to communicate with the wireless communication base station 104. As is understood by practitioners of ordinary skill in the relevant arts in light of the present discussion, multiple wireless communication base stations are able to be networked together to form a wireless communication network, such as a cellular network, that allows wireless communication with wireless communication devices within the coverage area of any of the multiple wireless communication base stations.

The wireless communication base station 104 of this example is associated with and in communication with a messaging server 102. In one example, the messaging server 102 accepts messages that are effectively addressed to particular wireless communication devices and transmits those messages to the proper wireless communication device. In one example, the messages are e-mail messages and each wireless communication device is associated with one or more e-mail address. Other mappings between message destination addresses and target devices associated with those addresses are able to be used. In the following discussion, the wireless communication device to which a particular message is addressed is referred to as the target device. Because the messaging server 102 communicates through the wireless communication base station 104, wireless communication devices within the wireless coverage area 110 are in wireless communication with the messaging server 102. In this simplified example of one wireless communication base station 104, once the wireless communication device leaves the wireless coverage area 110, it is not in communication with the messaging server 102.

The wireless communication coverage map 100 further depicts three wireless communication devices, a wireless communication device A 112, a wireless communication device B 114 and a wireless communication device C 106. As shown in the wireless communication coverage map 100, wireless communication device C 106 is within the wireless coverage area 110 of the wireless communication base station 104. The wireless communication device A 112 and the wireless communication device B 114 are not within the wireless coverage area 110 and therefore are not in wireless communication with the messaging server 102. Assuming that wireless communication device B 114 had been in the wireless coverage area 110, the wireless communication device B 114 has left communication with the messaging server 102. As described in further detail below, wireless communication device B 114 is able to have been designated as a host device for messages addressed to wireless communication device A 112. Because wireless communication device B 114 is a host for wireless communication device A 112, messaging server 102 transmitted messages to the wireless communication device B 114 that were addressed to wireless communication device A 112 while the wireless communication device B 114 was in the coverage area 110. After wireless communication device B 114 leaves the coverage area and has established a short range wireless link 116 with wireless communication device A 112, wireless communication device B 114 is able to transfer the message to wireless communication device A 112.

The messaging server 102 of one example includes a relay association processor 130, a relay processor 132 and a message transmitter 134. The messaging server 102 further maintains messaging logs 136. As described in further detail below, the message transmitter 134 is configured to transmit messages to a plurality of wireless communication devices. The relay association processor 130 is configured to determine, based upon data received from the plurality of wireless communication devices, at least one messaging relay association between a respective host device within the plurality of wireless communication devices and a respective target device within the plurality of wireless communication devices. The respective host device being a wireless communication device that is different from and able to accept messages addressed to the respective target device. The relay processor 132 is configured to determine that a target device of a messaging relay association within the at least one messaging relay associations is not in communicative contact with the message transmitter and to send to a host device of the messaging relay association, in response to determining that the target device is not in communicative contact with the message transmitter, a message addressed to the target device. The status of pending messages, messages being relayed, and of completed message deliveries are maintained in the messaging logs 136. The wireless communication base station 104 performs various processing to determine if a particular wireless communication device, such as the target device, is in communicative contact with the message transmitter 134. In one example, the messaging server 102 receives this status from the wireless communication base station 104.

Figure 2:
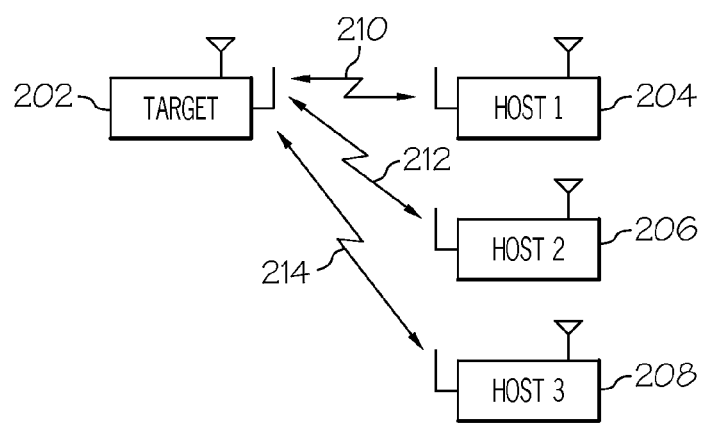
FIG. 2 illustrates a messaging relay association creation scenario according to one example.

FIG. 2 illustrates a messaging relay association creation scenario 200 according to one example. The messaging relay association creation scenario 200 creates messaging relay associations between host devices and target devices. In the following discussion, a target device refers to a device to which a message is addressed and a host device refers to a device that is designated to receive a message for a target device when that target device is not in communication with a messaging server.

In the messaging relay association creation scenario 200, a target device 202 is shown in short range wireless communication with three candidate host devices, candidate host device 1 204, candidate host device 2 206 and candidate host device 3 208. In this example, the target device 202 has established a short range wireless communication link with each of these host devices. The target device 202 establishes a first short range wireless link 210 with the candidate host device 1 204. The target device 202 also establishes a second short range wireless link 212 with the candidate host device 2 206 and a third short range wireless link 214 with the candidate host device 3 208. The first short range wireless link 210, second short range wireless link 212 and the third short range wireless link 214 are able to be maintained either simultaneously or in a serial time fashion where the target device 202 is in short range wireless communication with only one or two candidate host devices at a time. In one example, the short range wireless communication link is a Bluetooth® communication link.

Various techniques are used to select devices between which messaging relay associations are created. In establishing messaging relay associations, it is possible for a single device to be both a target device and also be a host device for other devices. It is further possible for each of two devices to both be a target device as well as a host device for the other device. In one example with a first device A and a second device B, device A is able to be a host device for device B, which is a target device relative to device A. Device B is simultaneously able to also be a host device for device A, which is a target device relative to device B. In this example, when device A is in communication with the messaging server, it is a host for device B and receives messages to relay to device B when device B is not in communication with the messaging server. Device B similarly receives messages for device A when device B is in communication with the messaging server and device A is not. Examples of several techniques to create messaging relay associations are described below.

In one example, when a wireless communication device is out of wireless coverage with a messaging server and has a short range wireless communication link with another suitable wireless communication device, these two wireless communication devices will attempt to create a messaging relay association with each other. In this case, each wireless communication device will be defined to be a host device for the other wireless communication device.

In one example, the user of the wireless communication device is presented with a number of options when prompted to create a messaging relay association. Examples of presented options include:

A) Decline creation of messaging relay association for this time only;

B) Always decline creation of messaging relay association with this wireless communication device;

C) Always decline creation of messaging relay associations (i.e. do not participate in message relaying);

D) Accept creation of messaging relay association for this time only;

E) Always accept creation of messaging relay association with this wireless communication device; and F) Always accept creation of messaging relay associations (i.e. always participate in message relaying).

In one example, when a user declines the creation of a messaging relay association for this time only, the processing will not re-attempt to create a messaging relay association until after one of the wireless communication devices re-establishes communication with the messaging server.

In one example, wireless communication devices will not attempt to create a messaging relay association for a configurable period of time after leaving communication with a messaging server. Waiting for this time period operates to prevent unnecessary prompting of the user for short periods of time when the target wireless communication devices go in and out of coverage (e.g., by driving through a concrete tunnel and briefly losing coverage, etc). This configurable time in one example is set to a period of approximately one hour.

In one example, when wireless communication devices create a messaging relay association, statistics associated with one or both of the wireless communication devices are communicated between the wireless communication devices. These statistics are also able to be communicated once the messaging relay association is established. These statistics include, for example, data to indicate the time interval between the most recent communication between host device and the messaging server and the time of short range wireless communication with the target device.

In one example, it is assumed that wireless communication devices often move throughout the day in a generally repetitive pattern. For example, a candidate host wireless device could be in communication with a messaging server while its user is at home, but then at a work location there may be no communication with the messaging server. A target device that is located at that work location comes into contact with the candidate host device. The time interval or difference in time between the candidate host device's encountering the target device after the host device's most recent communication with the messaging server is an indication of how recent messages for the target device will be on a subsequent day when that candidate host device would deliver relayed messages obtained during its last communication with the central communication server on that day.

The time between a host device's last communication with the messaging server and its subsequent contact with a target device is used in some examples to select or prioritize with which of several candidate host devices a messaging relay association should be created. In addition to providing this information during an initial attempt to create a messaging relay association, some host devices are configured to exchange the time since its last communication with the messaging server each time it encounters a target device after leaving communication with the messaging server. The target devices in this example assemble these statistics and identify which candidate host device has a statistically shortest time between its last communication with the messaging server and that target device. As described below, the messaging server also receives this information and is able to prioritize host devices to use when the messaging server is not in communication with a particular target device.

Each target device is able to create messaging relay associations with multiple host devices. This results in each target device having a number of host devices to which the messaging server 102 is able to send messages to be relayed to the target device when the target device is not in wireless communication with the messaging server 102. In some examples, the host devices for each target device are prioritized according to one or more metrics. One metric used to prioritize host devices is a statistic indicating the time between the host device's communicating with the messaging server and encountering the target device. Other metrics include a number of messages delivered by a particular host device to a particular target device and the frequency of recent encounters between a particular host device and target device. In one example, both the host device and the target device accumulate these metrics and communicate these accumulated metrics to the messaging server 102 when communication between the messaging server and any of the devices is restored.

FIG. 3 is a messaging relay association list 300 as maintained by a messaging server 102 of one example. The messaging relay association data accumulated by the wireless communication devices is uploaded to the messaging server when the wireless communication device is in communication with the messaging server. The messaging server accumulates that data into the messaging relay association list 300. The messaging relay association list 300 is maintained in one example by the messaging server 102 by accumulating metrics reported by wireless communication devices acting as both host devices and target devices. In one example, the wireless communication devices each maintain similar tables without a target column 302 since the target device is the device maintaining the table.

The exemplary messaging relay association list 300 has a target column 302, a host column 304, an elapsed time column 306 and a time of encounter column 308. The messaging relay association list 300 has a number of rows with one row each corresponding to a first encounter of the target device listed in the target column 302 and the host device listed in the host column 304. In one example, only the first encounter that occurs after a host device leaves communication with the messaging server is maintained in the messaging relay association list 300. Thus, subsequent encounters between two devices before the host device re-establishes communication with the messaging server are not recorded.

After a particular wireless communication device loses communication with the messaging server, that wireless communication device begins to record encounters with other wireless communication devices. Each of these encounters is then recorded in the messaging relay association list 300. The encounters stored in the messaging relay association list 300 in one example correspond to a short range wireless communication link data exchange between the target device and the candidate host device contained in the messaging relay association list 300. In one example, these short range wireless communication link data exchanges correspond to the wireless communication devices encountering another wireless communication device with which it has created a messaging relay association.

The target column 302 of the messaging relay association list 300 contains an identifier of the target device for the encounter. The identifier is able to be any unique identifier to identify the particular wireless communication device to the messaging server 102. For example, the identifier is able to be an identifier based upon one or more of an Electronic Serial Number (ESN), a Mobile Equipment Identifier (MEID), an International Mobile Equipment Identity (IMEI), or a Mobile Identification Number (MIN) of a wireless communication device.

The host column 304 contains identifiers of the candidate host device for each messaging relay association. The identifiers in the candidate host column 304 are similar to those described above that are used in the target column 302. The elapsed time column 306 indicates the number of minutes after the candidate host device's most recent communication with the messaging server that the target device encountered the candidate host device. As discussed above, statistics derived from these time intervals are used as metrics for prioritizing host device(s) to use for a particular target device. The time of encounter column 308 specifies a time and date of the encounter between the candidate host device and the target device specified by a row in the messaging relay association list 300. The time and date of the encounter is able to be used to weight or exclude entries in the messaging relay association list 300 based upon the age of the data. In one example, older data is weighted less than more recent data. Further, data older than a threshold is optionally discarded. Furthermore, a prioritization of messaging relay associations within the messaging relay association list 300 for a particular target device is able to be based upon the frequency of encounters between a particular pair of wireless communication devices, how recently those encounters occurred, and also how much time elapsed, as indicated in the elapsed time column 306.

In the messaging relay association list 300, the first line 320 indicates that wireless communication device identified by identifier "1" encountered a wireless communication device identified by identifier "2" on Apr. 1, 2010 at 1:09 PM. In this entry, device "1" is designated as a target device and device "2" is designated as the candidate host device. At the time of this encounter, the time between that encounter and the last communication between the candidate host device (i.e. device "2" in this example) and the messaging server was 55 minutes. This indicates that the candidate host device (i.e. device "2") was in communication with the messaging server at 12:14 PM on Apr. 1, 2010, 55 minutes before the encounter at 1:09 PM.

A second line 322 indicates a subsequent encounter between wireless communication device "1" as the target device and wireless communication device "2" as the candidate host device. The encounter associated with the second line 322 of the messaging relay association list 300 occurred on Apr. 3, 2010 at 11:01 AM. As indicated by the elapsed time column 306 of the second line 322, at the time of this encounter, the time between this encounter and the last communication between the candidate host device (i.e. device "2" in this example) and the messaging server was 109 minutes.

As illustrated by the first line 320 and the second line 322, the messaging relay association list 300 includes each encounter between candidate host devices and target devices that occur after the candidate host device leaves communication with the messaging server 102. Storing multiple encounters between the same devices allows, for example, statistics to be developed regarding the frequency of contacts between those devices and other metrics that are able to be used to prioritize host devices for particular target devices. As described above for this example, only the first encounter that occurs after a host device leaves communication with the messaging server is maintained in the messaging relay association list 300.

A third line 324 depicts an encounter between wireless communication device "1" as the target device and wireless communication device "3" as the candidate host device. The encounter associated with the third line 324 of the messaging relay association list 300 occurred on Apr. 4, 2010 at 3:07 PM and had an elapsed time between this encounter and the last communication between the candidate host device and the messaging server of 12 minutes. A fourth line 326 depicts an encounter between wireless communication device "1" as the target device and wireless communication device "2" as the host device. The encounter associated with the fourth line 326 of the messaging relay association list 300 occurred on Apr. 5, 2010 at 6:44 AM and had an elapsed time between this encounter and the last communication between the candidate host device and the messaging server of 15 minutes. A fifth line 328 depicts an encounter between wireless communication device "1" as the target device and wireless communication device "4" as the host device. The encounter associated with the fifth line 328 of the messaging relay association list 300 occurred on Apr. 1, 2010 at 8:53 AM and had an elapsed time between this encounter and the last communication between the candidate host device and the messaging server of 18 minutes. All of these encounters involve the same wireless communication device as the target device with different wireless communication devices as candidate host devices. The data in these lines of the messaging relay association list 300 are able to be used to determine which wireless communication devices are preferred to be used as host devices for a particular target device.

The following lines of the messaging relay association list 300 involve another target device. A sixth line 330 depicts an encounter between wireless communication device "10" as the target device and wireless communication device "2" as the candidate host device. The encounter associated with the sixth line 330 of the messaging relay association list 300 occurred on Apr. 5, 2010 at 3:09 PM and had an elapsed time between this encounter and the last communication between the candidate host device and the messaging server of 11 minutes. A seventh line 332 depicts an encounter between wireless communication device "10" as the target device and wireless communication device "3" as the candidate host device. The encounter associated with the seventh line 332 of the messaging relay association list 300 occurred on Apr. 5, 2010 at 3:53 PM and had an elapsed time between this encounter and the last communication between the candidate host device and the messaging server of 15 minutes.

Figure 4:
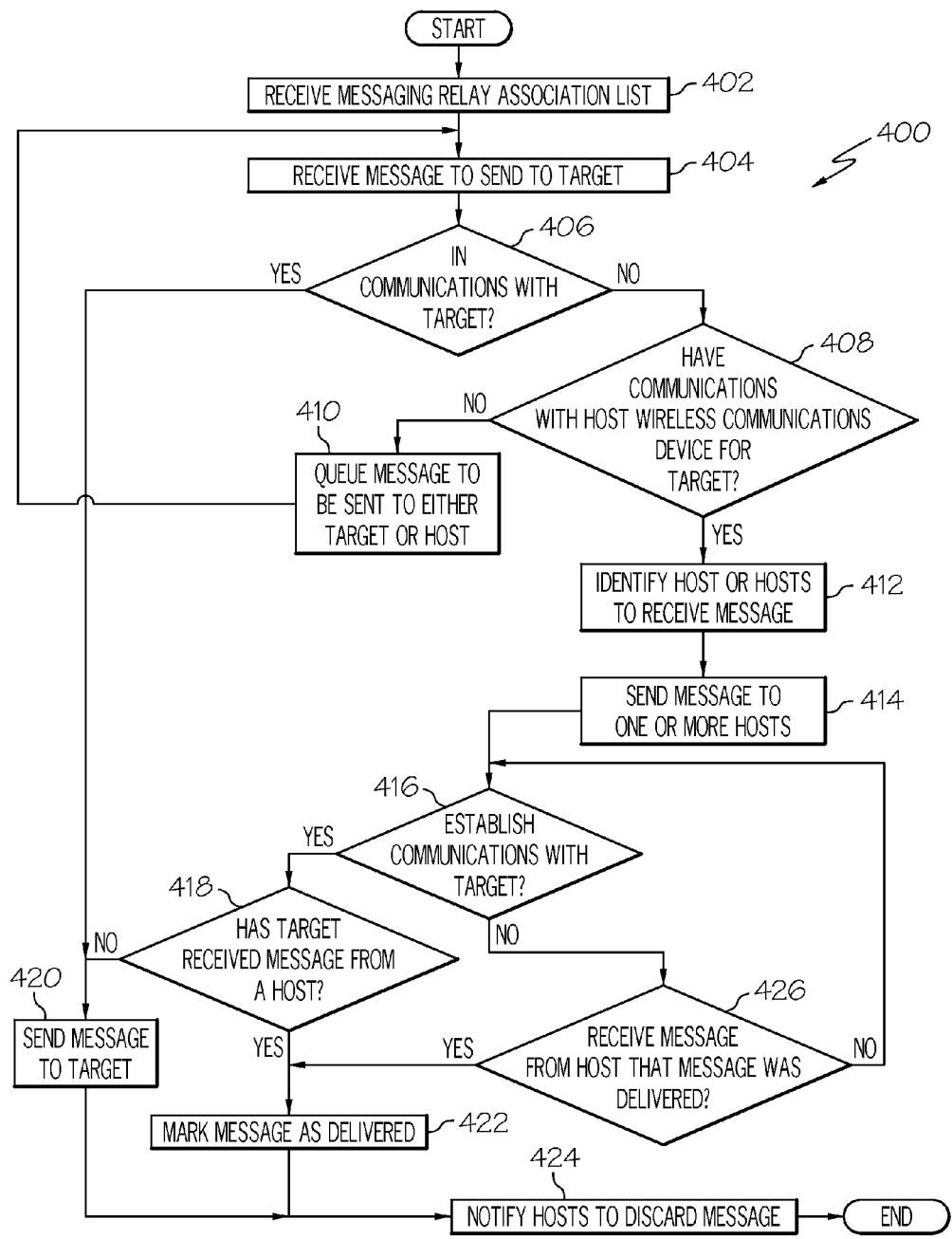
FIG. 4 illustrates a sending message to target device process, according to an example.

FIG. 4 illustrates a sending message to target device process 400, according to an example. The sending message to target device process 400 is able to be performed by a messaging server, such as the messaging server 102, to send wirelessly relayed messages for a target device. The wirelessly relayed messages are able to include an addressed message to the target device when the target device is not in communication with the messaging server.

The sending message to target device process 400 begins by the messaging server receiving, at 402, messaging relay association lists. In one example, message relay association lists are obtained from the target device, from candidate host devices, or from either of those wireless communication devices. As described above, messaging relay association lists contain specifics regarding relay associations between wireless communication devices. For example, messaging relay association lists specify target devices and candidate host devices for each messaging relay association along with various metrics for each association. As discussed above, messaging relay association lists include an elapsed time between when a candidate host device leaves communication with the messaging server and the time that the candidate host device is in short range wireless communication with the target device of the messaging relay association.

In one example, data to create, update and revise message association lists is received at various times by the messaging server. Messaging relay associations are able to be created by wireless communication devices at any time two wireless communication devices encounter each other through a short range wireless communication link while they are not in communication with the messaging server. Upon creating a messaging relay association, an indication of that messaging relay association is sent to the messaging server when either wireless communication device re-establishes communication with the messaging server.

The messaging relay association data that is depicted as being received at 402 is able to be received at various points during the operation of the messaging server. In one example, the following processing is performed after receipt of at least one set of messaging relay association data. This initially received data in one example is continuously updated and modified as messaging relay associations are created, modified, or cancelled.

The sending messaging to target device process 400 continues with the messaging server 102 receiving, at 404, a message that is addressed to be delivered to a specific wireless communication device. In various examples, messages are addressed according to various techniques. For example, messages may be addressed according to a telephone number of a wireless communication device. Other messages are able to be addressed to an internet e-mail address or various other identifiers, such as but not limited to, a personal identification number (PIN), an instant messaging identifier, an Internet Protocol (IP) address, a Media Access Control (MAC) address, etc. In a case of messages addressed to an internet e-mail address, the messaging server 102 of various embodiments contains a mapping between internet e-mail addresses and target wireless communication devices that are to receive messages addressed to such internet e-mail addresses.

The processing continues by determining, at 406, if the messaging server 102 is in communication with the target wireless communication device. If it is determined that the messaging server 102 is in communication with the target wireless communication device, the message is sent, at 420, to the target wireless communication device. In the case of the messaging server 102 being in communication with the target device itself, the message delivery processing of one example follows conventional message delivery and tracking techniques and does not utilize host devices.

If, however, it is determined that the messaging server 102 is not in communication with the target wireless communication device, host devices are used to assist in the delivery of the message to the target device. It is to be noted that some examples of the present method utilize various criteria to determine when, for purposes of using host devices to deliver messages, a target device is not in communication with the messaging server 102. In one example, a distinction is made between a device that is turned off or powered down and a device that simply leaves communication with the messaging server. For example, wireless communication devices are configured to transmit a message to the messaging server 102 when the user has powered down the device. If the messaging server receives such a "powered down" message, the messaging server does not determine, for purposes of using host devices to deliver messages, that the messaging server is not in communication with the target device.

Further examples wait for a delay to pass after the target device's last communication with the messaging server. In one example, the messaging server waits for a predetermined amount of time after its last communication with a target device before attempting to send messages to that target device via a host device. This delay reduces the use of host devices by not using host devices when the target device is only out of communication with the messaging server for short periods of time, such as when driving through a concrete tunnel and briefly losing coverage. In one example, this delay is set to a period of approximately 1 hour.

In one example, the processing proceeds by determining, at 408, if the messaging server is in communication with any host device associated with the target device. As described above, one or more host devices are defined according to messaging relay associations that were created by the devices and received in messaging relay association lists. If the messaging server 102 is not in communication with any host device for the target device, the processing proceeds to queuing, at 410, the message to be sent to either the target device or a host device associated with the target device. After queuing this message, the processing returns to receiving, at 404, a message to be sent to a target device.

If it is determined that the messaging server 102 is in communication with a host device associated with the target device, the processing proceeds by identifying, at 412, a host device or a number of host devices that are to be sent the message to be delivered to the target device.

In a case where the messaging server is not in communication with the target device, various examples are able to be configured to send messages for the target device to a limited number of host devices that are associated with the target device. The number of host devices to which the message is to be sent is limited in order to, for example, not overburden the communication system and distribute an overly large number of messages to host devices. As described above, the messaging relay association lists contain metrics that allow the ordering of the messaging relay association lists. In examples that limit the number of hosts to which messages are sent, the processing selects the host to receive the message according to the prioritized list. For example, only the three highest priority hosts on the messaging relay association list 300 for a particular target device may be selected by the messaging server to receive messages for that target device.

The sending messaging to target device process 400 continues by sending, at 414, the message to one or more host devices according to the prioritization of the messaging relay association list.

Once the message is sent to one or more host devices associated with the target device, the messaging server of one example continues to determine if the target device has received the message. In one example, the messaging server determines, at 416, if communication has been re-established with the target device. Communication can be re-established with the target device, for example, if the target device re-enters wireless data communication coverage. Once communication is re-established with the target device, the processing determines, at 418, if the target device received the message from a host device. If the target device did not receive the message from the host device, the messaging server sends, at 420, the message to the target device. If the target device did receive the message from a host device, the processing marks, at 422, the message within the messaging logs 136 of the messaging server as delivered.

Referring back to decision block 416, if communication has not been re-established with the target device, the processing of one example determines, at 426, if an indication has been received from a host device that the message was successfully delivered to the target device. One example of such a scenario is when a host device leaves communication with the messaging server after receiving a message for the target device and then encounters the target device. Once the message is successfully delivered by the host device to the target device, the host device records the successful delivery. If that host device re-establishes communication with the messaging server before the target device, the host device sends an indication to the messaging server of the successful delivery to the target device. In that case, the processing marks, at 422, the message as delivered within the logs of the messaging server.

After either the message has been sent to the target device, at 420, or the message has been marked as delivered by receiving notification from the target device or a host device indicating successful delivery by a host device, the processing of the messaging server notifies, at 424, the host devices to discard the message. The message may be discarded because the target device has already received the message. The processing then ends.

Figure 5:
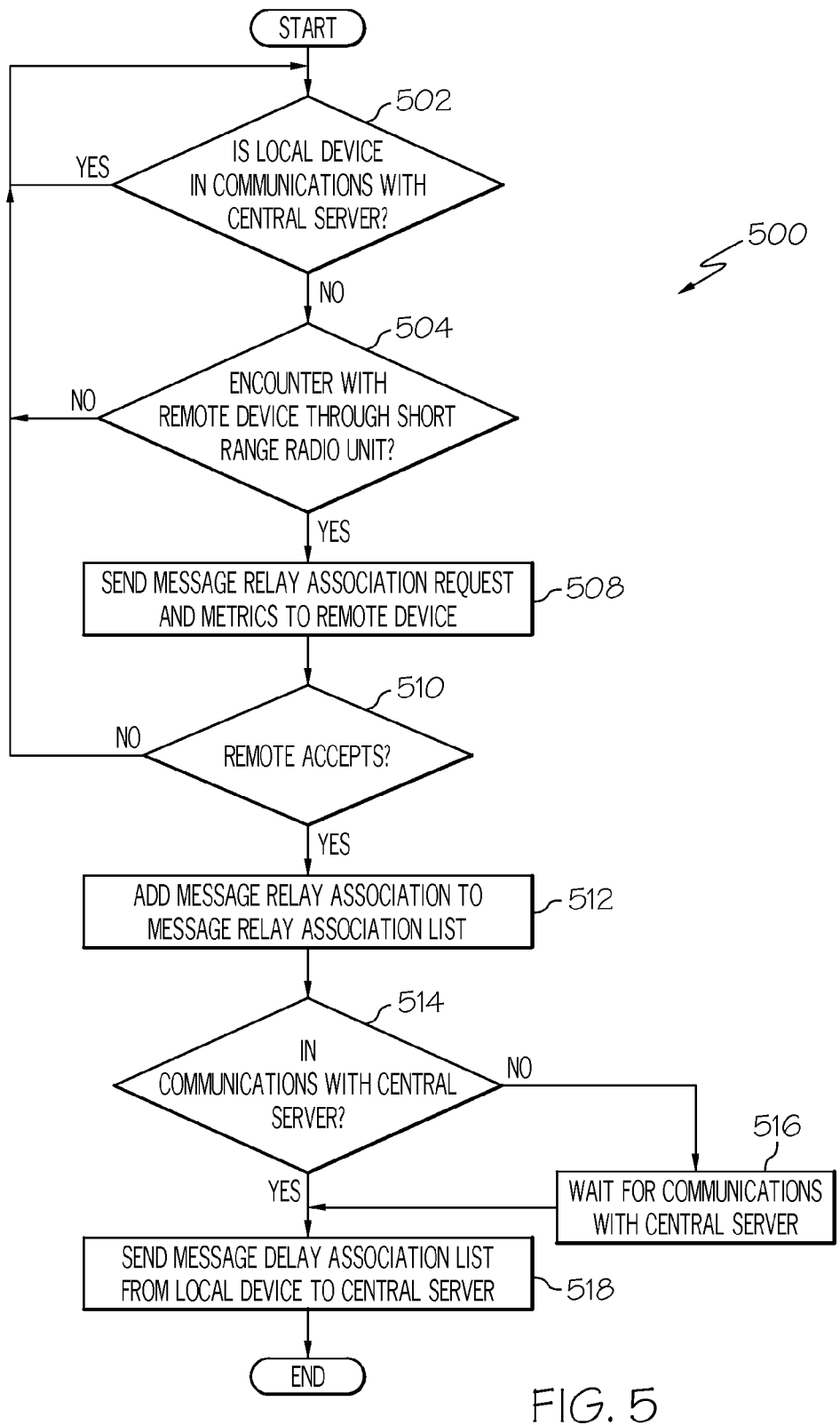
FIG. 5 illustrates a request messaging relay association process, in accordance with one example.

FIG. 5 illustrates a request messaging relay association process 500, in accordance with one example. The request messaging relay association process 500 is performed by a wireless communication device to establish a messaging relay association between that wireless communication device, referred to as a "local device," and another wireless communication device, referred to as a "remote device." In such an association, each device may operate as a host for the other. In a further example, the devices may operate to limit the role assumed in the association, such as having only one device operate as a host for the other.

The request messaging relay association process 500 begins by determining, at 502, if the local device is in communication with the messaging server. If the local device is in communication with the messaging server, the processing repeats that determination.

If the wireless communication device is not in communication with the messaging server, the processing proceeds to determine, at 504, an occurrence of an encounter with a remote device through a short range wireless link. In one example, such an occurrence of an encounter with a remote device is determined if the local establishes a paired Bluetooth® communication session with a remote device. In further examples, establishing or maintaining any suitable short range wireless link with a remote device is able to cause the determination of the encounter. If no encounter is determined, the processing returns to determine, at 502, if the local wireless communication device is in communication with the messaging server.

If an encounter with a remote device through a short range wireless link is determined, the processing of one example sends, at 508, a messaging relay association request and message relay related metrics to the remote device. In one example, the messaging relay association request is communicated over a short range wireless communication link.

In one example, a local device includes messaging related metrics along with each messaging relay association request. The messaging related metrics of one example include an elapsed time indicator that reflects the amount of time between the last contact the local device had with the messaging server and the time of this encounter. Such information is used, as is described above, to evaluate which wireless communication devices are best selected to be host devices for a particular target device. It is to be understood that the above describes one set of criteria for exchanging messaging related metrics. Other criteria are able to be used to determine when to exchange messaging related metrics and other metrics are also able to be communicated. For example, metrics may be exchanged upon inquiry by the remote device. Further, messaging relay associations are able to be created in some examples without exchanging messaging related metrics between the wireless communication devices.

After sending the messaging relay association request, either with or without messaging related metric data, the processing continues by determining, at 510, if the remote device accepted the request. In various embodiments, messaging related metrics are able to be sent by the remote device in response to a messaging relay association request along with an indication of acceptance of the request. In one example, the remote device responds to messaging relay association requests by sending a message over a short range wireless link that indicates either acceptance or rejection of the request. If the request is rejected, the processing returns to determining, at 502, if an encounter with a remote device occurs, as is described above.

If the remote device accepts the messaging relay association request, the processing continues by adding, at 512, the messaging relay association to the messaging relay association list of the local device. In various examples, local devices retain a list of messaging relay associations that were created. Such messaging relay association lists specify, for example, an identifier of the associated remote device, messaging relay metrics for that remote device, the time that the association was created, the time that the particular remote device was last encountered, or combinations of these values.

The processing next determines, at 514, if the local device is in communication with the messaging server. If the local device is not in communication with the messaging server, the processing waits, at 516, for communication with the messaging server. If or when the local device is in communication with the messaging server, the processing sends, at 518, the messaging relay association list for the local device from the local device to the messaging server. The processing then completes.

Figure 6:
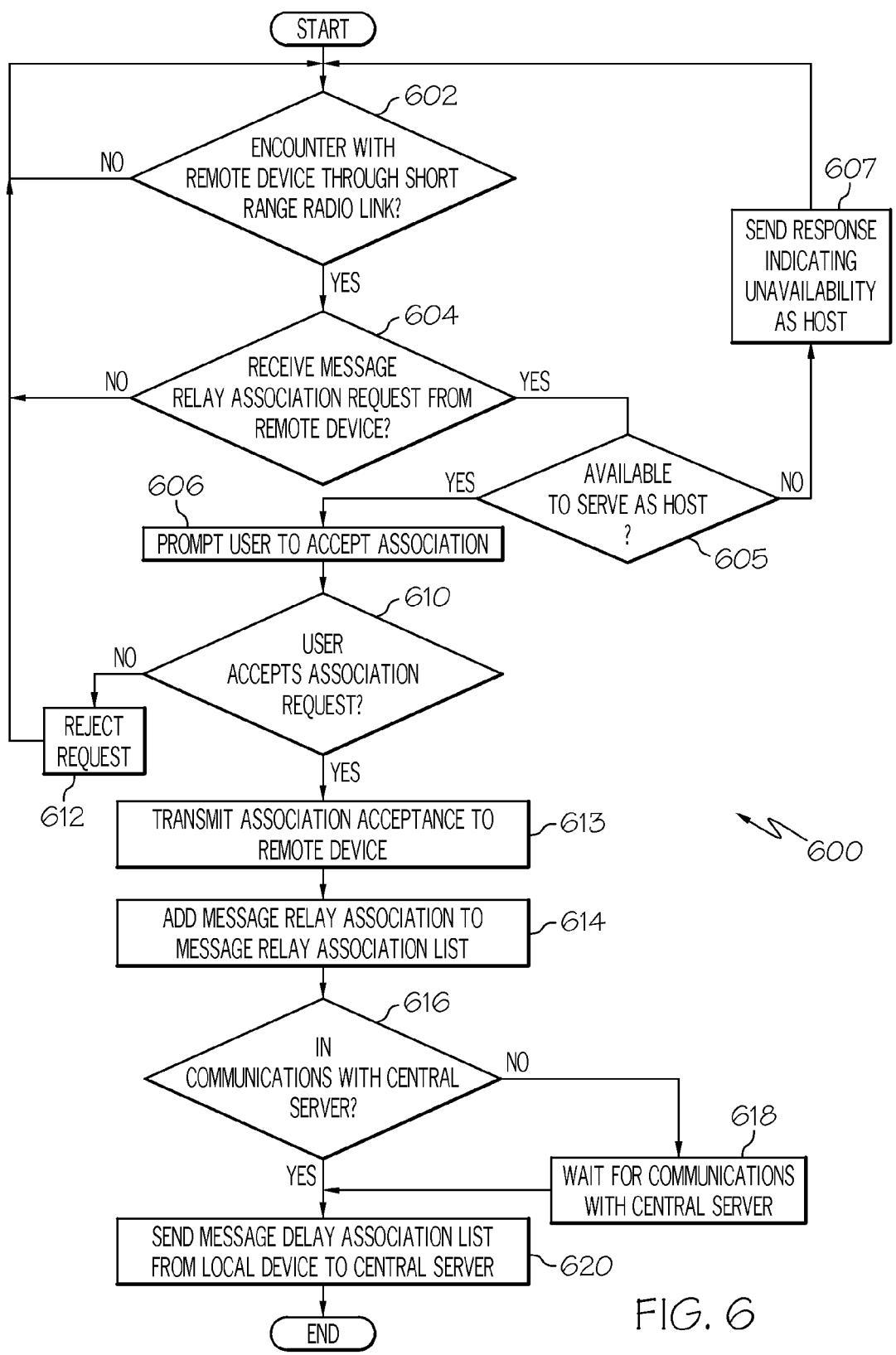
FIG. 6 illustrates a messaging relay association receipt request process, in accordance with one example.

FIG. 6 illustrates a messaging relay association receipt request process 600, in accordance with one example. The messaging relay association receipt request process 600 is performed by a wireless communication device in response to receiving a messaging relay association request as part of the process of establishing a messaging relay association between that wireless communication device, referred to below as the "local device," and another wireless communication device, referred to below as the "remote device."

The messaging relay association receipt request process 600 begins by determining, at 602, an encounter with a remote device through a short range wireless link. As described above with regards to the request messaging relay association process 500, an encounter between wireless communication devices is determined by an established paired Bluetooth® relationship with one another or by establishing or maintaining any suitable short range wireless link with a remote device. If no encounter is determined, the processing repeats the determination.

If an encounter is determined, the processing receives, at 604 a messaging relay association request from the remote device. If a messaging relay association request has not been received, the processing returns to determining an encounter, at 602.

If a messaging relay association has been received, at 604, the processing determines, at 605, if the wireless communication device is able to act as a host device. In various examples, a wireless communication device is not able to act as a host device under certain conditions, for example, if the wireless communication device has insufficient available storage space or remaining power pack energy. If it is determined that the wireless communication device is unable to serve as a host, the process sends, at 607, a response to the remote device indicating that the wireless communication device is unavailable to act as a host device. The process then returns to determining, at 602, an encounter with a remote device, as described above.

If the wireless communication device is able to serve as a host, at 605, the processing continues to prompt, at 606, the user to accept the association. As described above, a user is able to be prompted with a variety of options, such as to accept or reject the request for this request only, accept or reject for all requests from this remote device, or accept or reject all requests.

The processing then determines, at 610, if the user accepts the association request. If the user does not accept the association request, the processing rejects, at 612, the request. Rejecting the request generally results in a response message being sent to the remote device indicating that the messaging relay association request is rejected. The processing then returns to determining an encounter, at 602.

If the user accepts the association request, at 610, the processing transmits, at 613, an association acceptance to the remote device in response to the messaging relay association request. In one example, an association acceptance is a data message sent to the requesting remote device accepting the messaging relay association request. The processing then adds, at 614, the messaging relay association to the messaging relay association list of the local device. In various examples, local devices retain a list of messaging relay associations that were created. Such messaging relay association lists specify, for example, an identifier of the associated remote device, messaging relay metrics for that remote device, the time that the association was created, the time that the particular remote device was last encountered, or combinations of these values.

The processing next determines, at 616, if the local device is in communication with the messaging server. If the local device is not in communication with the messaging server, the processing waits, at 618, for communication with the messaging server. If or when the local device is in communication with the messaging server, the processing sends, at 620, the messaging relay association list for the local device from the local device to the messaging server. The processing then completes.

Figure 7:
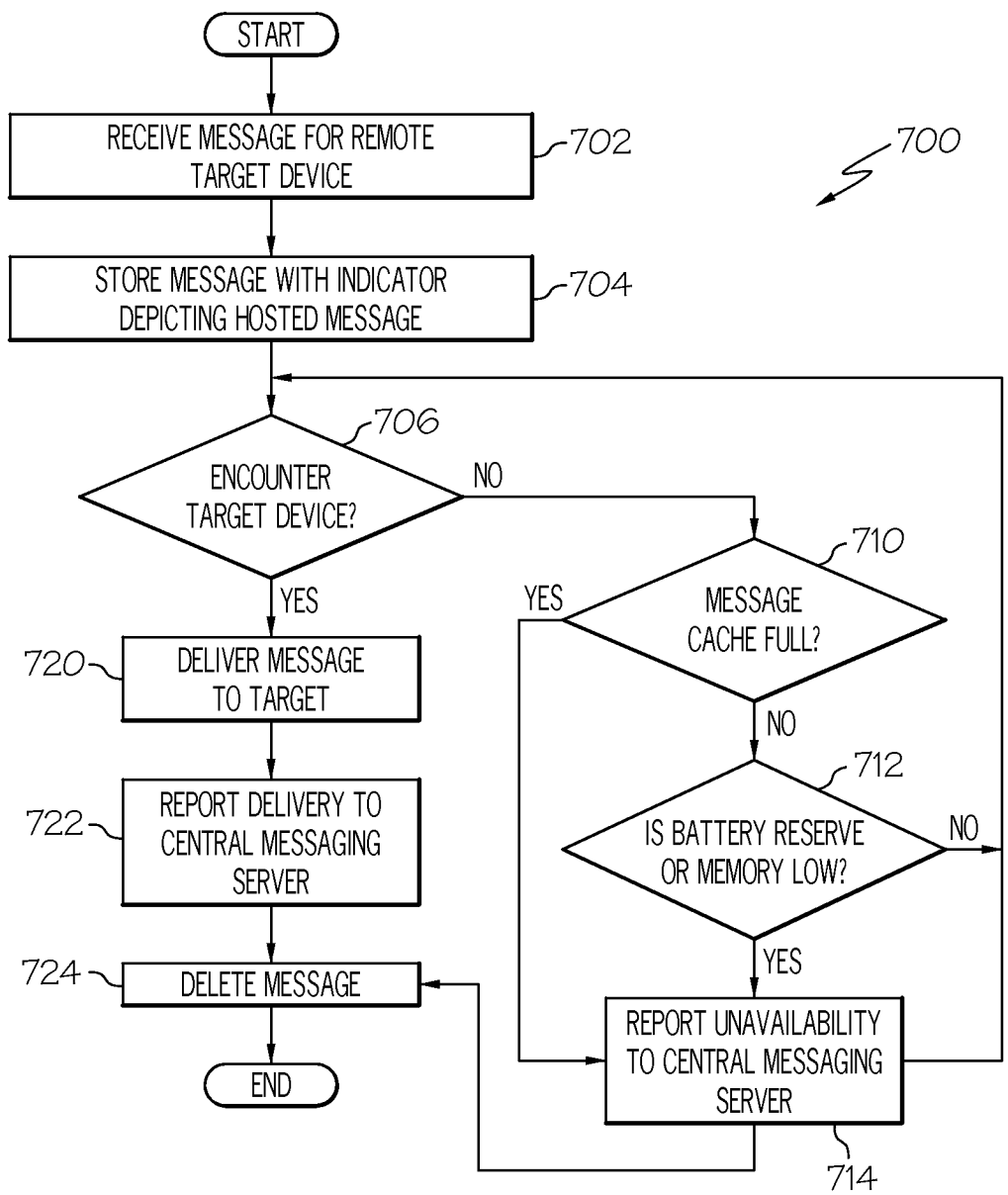
FIG. 7 illustrates host device message relay process, in accordance with one example.

FIG. 7 illustrates host device message relay process 700, in accordance with one example. The host device message relay process 700 is performed in one example by a host device that is relaying a message from a messaging server to a target device when the target device is not in communication with the messaging server. With respect to the host device that is executing the host device message relay process, the target device is a remote wireless device.

The host device message relay process 700 begins by receiving from the messaging server, at 702, a message for a remote target device. The processing continues by storing, at 704, that received message on the host device. In one example, messages sent to a host device that are to be relayed to a remote target device are stored with an indicator depicting that the message is a hosted message, i.e. to be delivered to another device. For example, a received message list on the local device is able to have a special icon to indicate that the message is destined for another device. In some examples, hosted messages that are messages to be delivered to another device are encrypted so as to prevent the hosted messages from being read by a user of the host device. In one example, such hosted messages are encrypted with keys only available to the target device so that the hosted messages are only able to be decrypted and read by a user of the target device to which the hosted message is addressed.

The host device message relay process 700 continues by determining, at 706, an encounter with a wireless communication device that is the target device for the received message. As described above, encounters with wireless communication devices are able to be of any suitable type, such as by establishment of access through a short range wireless communication link or subsystem.

If an encounter with the target device is not determined, at 706, the processing of one example determines if the local device is able to continue to receive hosted messages by determining, at 710, if the message cache is "full." A message cache can be determined to be full if the memory for storing messages contains more than a threshold amount of data. One example of the message cache being full is when memory used to store messages is over 90% used. If the message cache is not determined to be full, the processing continues to determine, at 712, if the local device's power pack energy or battery is low or if available storage space memory is low. If these conditions are determined to not exist, the processing returns to determining, at 706, an encounter with a wireless communication device that is the target device for a received hosted message.

If it is determined that the message cache is full, the local device's power pack energy or battery is low, or if the available storage space memory is low, the processing reports, at 714, to the messaging server that this local device is unavailable to act as a host device. In one example, the device further configures itself to not initiate and reject messaging relay associations with other devices, until such time as its battery or storage space is sufficient again. After determining that the local device is unavailable to act as a host device, the local device in one example continues to monitor the conditions that caused the local device to declare that it is unavailable to act as a host device. Once those conditions return to a state to allow the local device to again act as a host device, the local device then reports to the messaging server that the local device is available to act as a host device. In one example, once the message cache is no longer determined to be full, or the local device's power pack recharges, or if the available storage memory space is no longer low, the local device reports that it is again available to act as a host device. The local device then continues to configure itself to again be able to initiate and fully process messaging relay association requests from other devices, as described above, based on the configuration of the local device.

When it is determined, at 706, that the target device is encountered, the processing proceeds to deliver, at 720, the message to the target device. As part of delivering the message to the target device, the host device may receive an indication from the target device that the target device has already received that message and that the host device can abort the delivery and delete this message from the host device's message cache.

Once the message is delivered to the target device, various examples use indicators on the user interface of the target device, the host device, or both to indicate that the message was delivered by a host device. The target device is able to display a special icon to indicate that the message was delivered by a host device. Similarly, the host device is able to display an icon indicating that the message carried by the host device was delivered to the target device.

The processing continues to report, at 722, delivery of the message to the messaging server once communication is again established with the messaging server. Reporting of actual message delivery by the host device allows the messaging server to, for example, indicate to other host devices that the message should be deleted. Further, the messaging server is able to prioritize the messaging relay association list for a particular target device according to which host device actually delivers more messages to that target device. The message is then deleted, at 724, and the processing ends.

Figure 8:
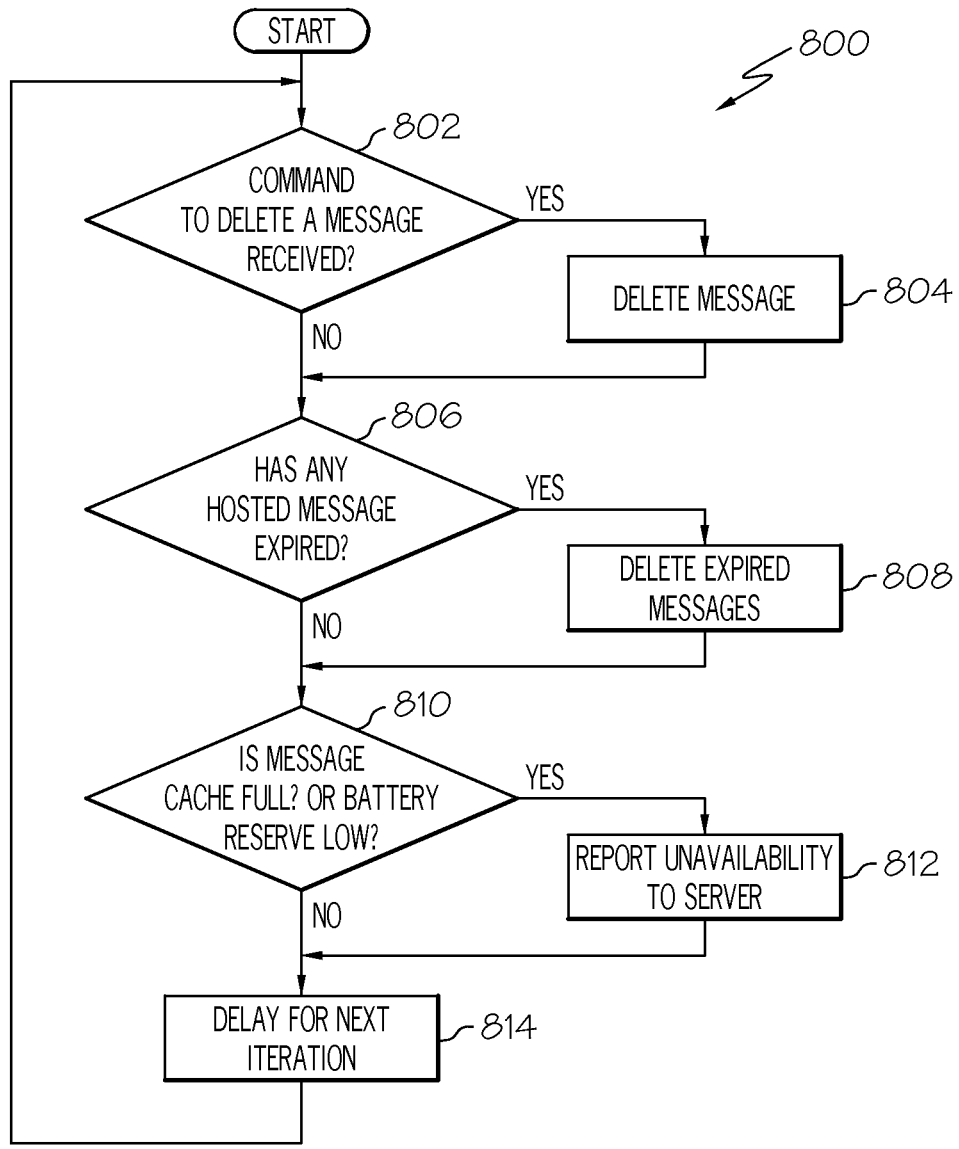
FIG. 8 illustrates a message cache maintenance process, in accordance with one example.

FIG. 8 illustrates a message cache maintenance process 800, in accordance with one example. The message cache maintenance process 800 may be periodically performed by a host device in one example to determine if hosted messages should be deleted the host device's message cache or if the host device should report to the messaging server that it is no longer able to serve as a host device.

The message cache maintenance process 800 determines, at 802, if the host device has received a command, such as from the messaging server, to delete a message or messages. Such a command could be sent in response to the messaging server determining that the target device has received the message. If a command to delete a message has been received, the processing deletes, at 804, the message or messages specified by that command.

The processing then determines, at 806, if any hosted message has expired. In one example, a specified time threshold is defined and a message that has been stored for longer than the specified time threshold is determined to have expired. Expiration of messages stored on a host is configured by some examples to limit the number of messages stored on the host devices. If messages are determined to have expired, the processing deletes, at 808, the expired messages from the host message storage.

The processing proceeds to determine, at 810, if 1) the message cache is "full" or 2) a battery reserve of the host device is low. A message cache can be determined to be full if the available memory for storing messages contains more than a threshold amount of data. One example of the message cache being full is when memory used to store messages is over 90% used. Low battery reserve is able to be declared if, for example, the remaining battery capacity is less than 10% of full capacity. If any of these conditions is true, the processing reports, at 812, to the messaging server that this host device is unavailable to act as a host device. In one example, the device further configures itself to not initiate and reject messaging relay associations with other devices, until such time as these conditions are not true.

The processing then delays, at 814, for the next iteration of the message cache maintenance process 800. In one example, the message cache maintenance process 800 is performed every ten (10) minutes, so the delay at 814 lasts for ten minutes in that example. The message cache maintenance process 800 then returns to determine, at 802, if a command to delete a message has been received.

In addition to the above described messaging relay association creation techniques, further example systems support alternative methods of creating messaging relay associations between wireless communication devices. Examples of alternative messaging relay association creation techniques include manual creation, reverse message sending hosting based creations, and motion observation based association creations.

Manual messaging relay association creation techniques allow a user of a wireless communication device to explicitly define other wireless messaging devices with which to create messaging relay associations. In one example, a wireless messaging device is paired with a number of other wireless messaging devices. In this example, a user of that device is able to create messaging relay associations by selecting wireless communication devices from that list of paired devices. Further examples allow any other suitable technique to allow a user to specify other wireless communication devices with which to create messaging relay associations. Such associations may be instantly created upon uploading messaging relay association data from the creating wireless communication device to the messaging server or may require acceptance by the user of the other wireless communication device. For example, the originating wireless communication device is able to upload a specification of the manually created messaging relay association and the messaging server responds by sending a prompt to the other wireless messaging device of that association to accept or reject the manually created messaging relay association.

Some wireless communication devices include processing to send messages when that device is out of communication with the messaging server. When such a wireless communication device has a message to send and is not in communication with the messaging server, the device identifies nearby wireless communication devices to act as host devices that will relay the message to the messaging server. The wireless communication device uses various techniques to identify and determine which nearby wireless communication devices are best suited to be a host relay for the message to be sent, and communicates the message to be sent to the best device or devices. Messaging relay associations as described above to be used by the messaging server to send messages to the wireless communication device are able to be created by using the same wireless communication devices selected to be hosts for sending of the messages from the wireless communication device to the messaging server.

Figure 10:
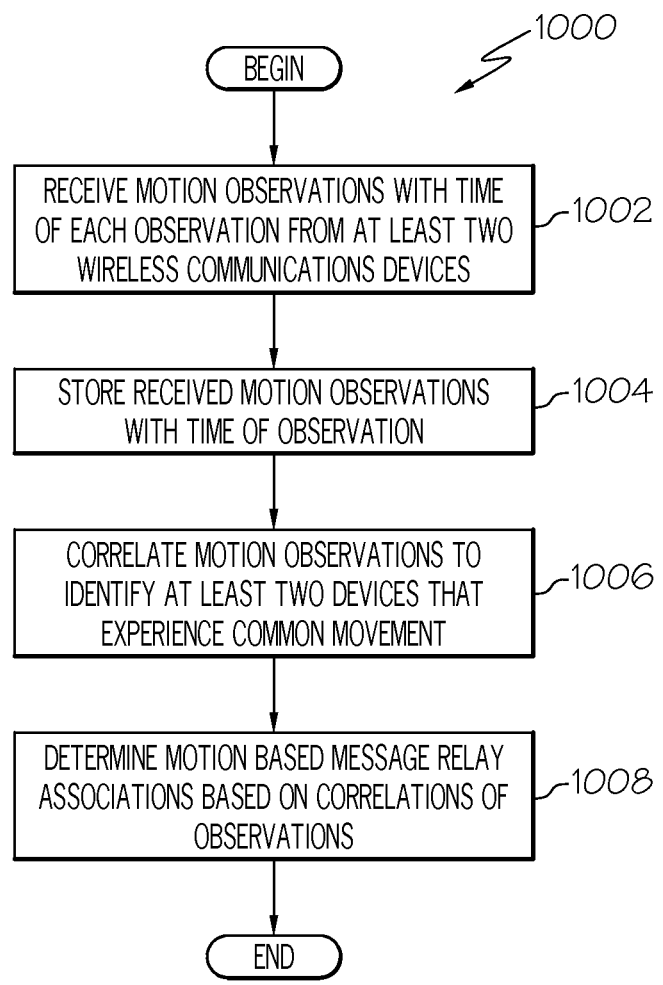
FIG. 10 illustrates a motion observation based messaging relay association determination process, according to one example.

FIG. 10 illustrates a motion observation based messaging relay association determination process 1000, according to one example. Motion observation based association creations are based upon time correlating motion observation measurements received from each of multiple wireless communication devices. In one example, accelerometer data is recorded by each wireless communication device along with a time of observation to determine the motions experienced by the wireless communication device. In various examples, accelerometer data is recorded at all times or only when the wireless communication device is not in communication with a messaging server. These wireless communication devices report the recorded accelerometer data along with the time of each observation when in communication with the messaging server. The messaging server receives, at 1002, the motion observation data reported by each wireless communication device along with the time of each of those observations. These motion observation data and the time of their observation is then recorded by the messaging server, at 1004. The messaging server then correlates, at 1006, these motion observations to identify at least two wireless communication devices that experience common movement by identifying time correlated movement data. Motion observation based messaging relay associations are then determined, at 1008, based upon these identifications of at least two wireless communication devices that experience common movement. The process then ends.

In one example, the recorded accelerometer data is sent as a hash value after being passed through a hash function to allow a simpler comparison of data reported by different wireless communication devices. Analysis of the time correlated hashed accelerometer data from the multiple wireless communication devices allows identification of two or more wireless communication devices that underwent similar motions, which indicate common movements by those devices. One example of such a similar set of motions is when a bunch of users are sitting in the same car or bus and go over a series of bumps. Messaging relay associations are then be crated by the messaging server for devices that are carried by users who ride in the same car or bus. These messaging relay associations that are automatically created by the messaging server are then added to the messaging relay association list 300, described above, and processed in a manner similar to other entries in that list.

The automatic creation of messaging relay associations by the messaging server enhances a user's probability of receiving a message when out of communication with the messaging server. In a situation where long range wireless communication is unavailable to some of those people, others in the car or bus would operate as host devices when they are in long range wireless coverage and deliver messages when they are in that car or bus for a future commute.

The amount of data to be analyzed by the messaging server is able to be reduced by several techniques. A messaging server could be configured to only correlate motion data for wireless communication devices that are communicating to the same base tower or set of base towers. This would provide a geographical correlation element as well. Geographical data as reported by the wireless communication device, such as geo-location information obtained by a Global Positioning System (GPS) or other suitable component of the wireless communication device, is also able to be used to limit the number of wireless communication devices whose motion data are compared to and correlated with each another. The motion data that is analyzed by or even communicated to the messaging server is also able to be limited by applying a threshold value. Only motion data that exceeds a threshold, such as encountering bumps of a certain magnitude, are reported to or analyzed by the messaging server.

Figure 9:
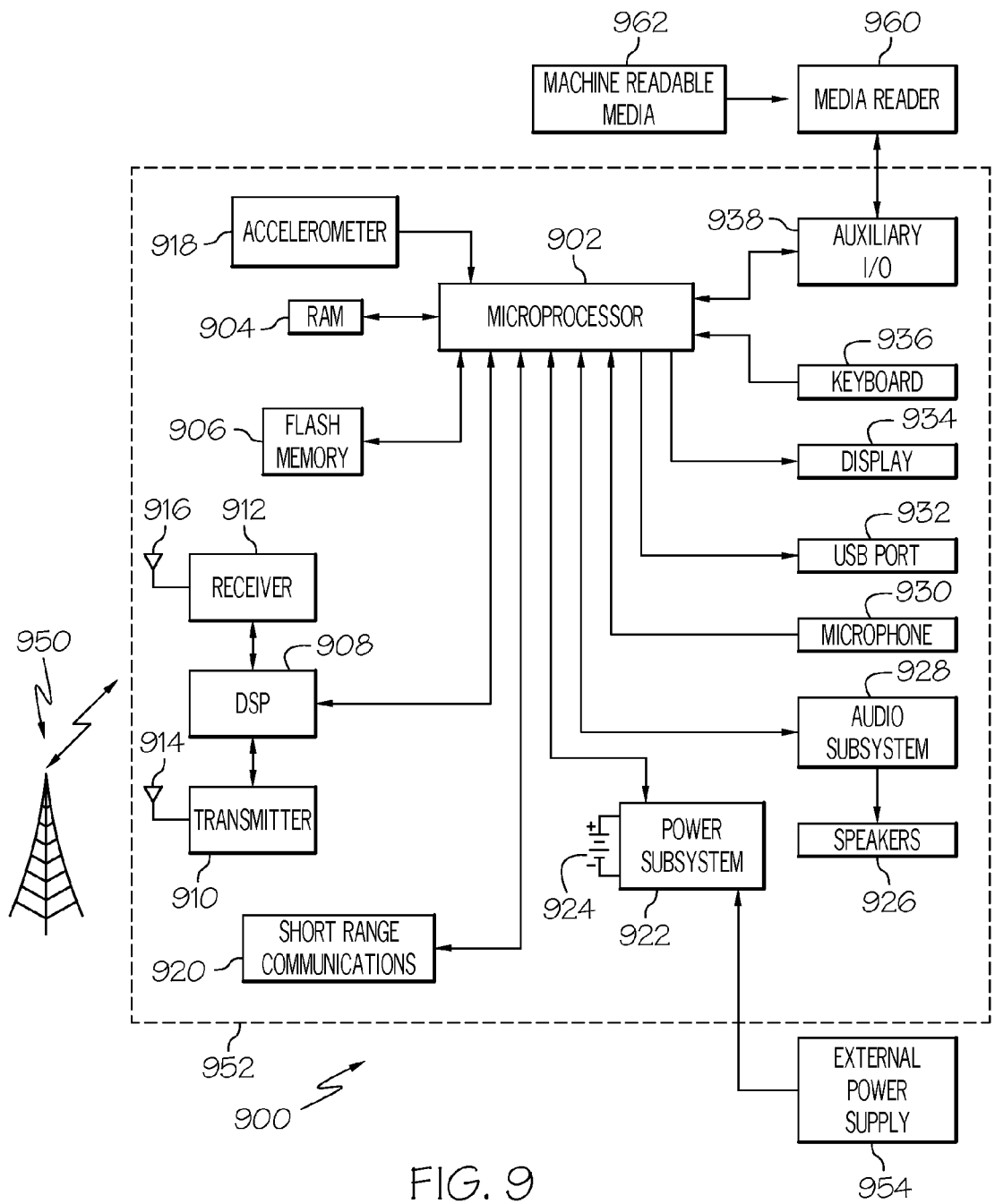
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. In this example, an electronic device 952 is a wireless two-way communication device that is able to provide one or both of voice and data communication capabilities. Such electronic devices communicate with a wireless voice or data network 950 via any suitable wireless communication protocol or protocols. Wireless voice communication is performed using either analog or digital wireless communication protocols according to the network 950 to which the wireless communication device is connected. Data communication to and from the electronic device 952 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated electronic device 952 is an example electronic wireless communication device includes two-way wireless communication components to provide wireless data communication with a wireless data network, a wireless voice network, or both. Such electronic devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communication protocols with which the device is intended to operate.

Data communication with the electronic device 952 generally includes receiving data, such as a text message or web page download, through the receiver 912 and providing that received data to the microprocessor 902. The microprocessor 902 is then able to further process the received data for output to the display 934 or to other devices such as an auxiliary I/O device 938 or through the Universal Serial Bus (USB) port 932. The electronic device 952 also allows a user to create data items, such as e-mail messages, using the keyboard 936 in conjunction with the display 934 and possibly with data received through an auxiliary I/O device 938. Such composed items are then able to be transmitted over a communication network through the transmitter 910.

The electronic device 952 performs voice communications by providing received signals from the receiver 912 to the audio subsystem 928 for reproduction by speakers 926. A user's voice is able to be converted to electrical signals from microphone 930 for transmission by transmitter 910.

A short-range communication subsystem 920 provides communication between the electronic device 952 and different systems or devices. Examples of short-range communication subsystems 920 include an infrared device and associated circuits and components, or a Radio Frequency based communication subsystem such as a Bluetooth®, Zigbee®, Wi-Fi or Wi-MAX communication subsystem to provide for communication with similarly-enabled systems and devices.

The electronic device 952 includes a microprocessor 902 that controls device operations for the electronic device 952. The microprocessor 902 interacts with the above described communication subsystem elements to implement and control wireless communication with the network 950. The microprocessor 902 further performs control and data exchange functions by interacting with, for example, flash memory 906, random access memory (RAM) 904, auxiliary input/output (I/O) device 938, USB Port 932, display 934, accelerometer 918, keyboard 936, audio subsystem 928, microphone 930, a short-range communication subsystem 920, a power subsystem 922, an accelerometer 918, and any other device subsystems.

An internal power pack, such as a battery 924, is connected to a power subsystem 922 to provide power to the circuits of the electronic device 952. The power subsystem 922 includes power distribution circuitry to supply electric power to the various components of the electronic device 952 and also includes battery charging circuitry to support recharging the battery 924. An external power supply 954 is able to be connected to the power subsystem 922. The power subsystem 922 includes a battery monitoring circuit that provide a status of one or more battery conditions, such as remaining capacity, temperature, voltage, current draw, and the like.

The USB port 932 provides data communication between the electronic device 952 and one or more external devices. Data communication through USB port 932 enables various user data, such as data files or configuration parameters for the electronic device 952 to be exchanged between the electronic device 952 and an external device. The USB port 932 is also able to be used to convey external power to the power subsystem 922 from a suitable external power supply.

Operating system software used by the microprocessor 902 is stored in flash memory 906. In addition to, or in place of, flash memory 906, a battery backed-up RAM or other non-volatile storage data elements are able to store operating systems, other executable programs, or both. As an example, a computer executable program configured to perform the request messaging relay association process 500, messaging relay association receipt request process 600, host device message relay process 700, the message cache maintenance process 800, and described above, is included in a software module stored in flash memory 906.

RAM memory 904 is used to store data produced or used by microprocessor 902. RAM memory is further able to temporarily store program data from flash memory 906 or from other storage locations. RAM 904 is also used to store data received via wireless communication signals or through wired communication.

The microprocessor 902 in some examples executes operating system software as well as various other software applications such as user applications, small, special purpose applications referred to as "apps," and the like. Some software, such as operating system and other basic user functions such as address books are able to be provided as part of the manufacturing process for the electronic device.

In addition to loading applications as part of a manufacturing process, further applications are able to be loaded onto the electronic device 952 through, for example, the wireless network 950, an auxiliary I/O device 938, USB port 932, short-range communication subsystem 920, or any combination of these interfaces. Once these applications are loaded into the electronic device 952, these applications are executed by the microprocessor 902.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. The media reader 960 is alternatively able to be connected to the electronic device through the USB port 932 or computer readable program code is alternatively able to be provided to the electronic device 952 through the wireless network 950.

The electronic device 952 includes an accelerometer 918 to determine physical device motion observations that are reported to and stored by the microprocessor 902. As described above, motion observations are able to be encoded, filtered or both by microprocessor 902 and then reported to a messaging server.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A wireless communication device, comprising:
 a short range communication subsystem;
 a memory; and a processor configured to:
  receive, from a messaging server, a message addressed for a target device, the target device being a remote wireless communication device;
  store the message into the memory;
  initiate, subsequent to receiving the message and while not in a communications coverage area associated with the messaging server, access to the target device through the short range communication subsystem;
  transmit, through the short range communication subsystem, a request to create a messaging relay association, the messaging relay association defining at least one target device and at least one host configured to receive messages addressed to the at least one target device to be transmitted to the target device in response to initiation of access to the target device;
  determine a time of leaving communication with the messaging server;
  determine a time of encounter with the target device corresponding to a time of establishing a short range wireless link through the short range communication subsystem with the target device;
  transmit along with the request a specification of a difference between the time of encounter and the time of leaving communication with the messaging server; and
  transmit, in response to initiation of the access, the message to the target device through the short range communication subsystem.

2. The wireless communication device of claim 1, the processor further configured to:
  receive, from the target device, acceptance of the request;
  create, in response to receiving the acceptance, a messaging relay association with the target device; and
  transmit to the messaging server, an indication of the messaging relay association.

3. The wireless communication device of claim 1, the processor further configured to:
  receive, from the target device through the short range communication subsystem, a request to create the messaging relay association; and
  transmit, to the target device, acceptance of the request.

4. The wireless communication device of claim 3, the processor further configured to:
  transmit, to the target device through the short range communication subsystem over the short range communication subsystem in response to receiving the request, an indication of availability to be a host device configured to receive messages addressed to the at least one target device to be transmitted to the target device in response to initiation of access to the target device.

5. The wireless communication device of claim 1, the processor further configured to transmit, to the messaging server, an ability to serve as a host device.

6. The wireless communication device of claim 5, the processor determining the ability to serve as a host device based upon at least one of available storage space and remaining power pack energy.

7. The wireless communication device of claim 1, wherein the processor is configured to initiate access in response to leaving the communications coverage area associated with the messaging server.

8. The wireless communication device of claim 1, further comprising a data message communications subsystem, wherein the short range communications subsystem comprises a Bluetooth communications subsystem that is different than the data message communications subsystem.

9. The wireless communications device of claim 8, wherein the processor is configured to initiate access by being configured to establish a paired Bluetooth communication session with the remote device.

10. A method for hosting wirelessly relayed messages for a target device, the method comprising:
  performing at least one of the following with a processor of a wireless communication device:
  receiving, from a messaging server, a message addressed for a target device, the target device being different than the wireless communication device;
  storing the message;
  initiating, subsequent to receiving the message and while not in a communications coverage area associated with the messaging server, access to the target device through a short range wireless link of the wireless communication device;
  transmitting, through the short range communication subsystem, a request to create a messaging relay association, the messaging relay association defining at least one target device and at least one host configured to receive messages addressed to the at least one target device to be transmitted to the target device in response to initiation of access to the target device;
  determining a time of leaving communication with the messaging server;
  determining a time of encounter with the target device corresponding to a time of establishing a short range wireless link through the short range communication subsystem with the target device;
  transmitting along with the request a specification of a difference between the time of encounter and the time of leaving communication with the messaging server; and
  transmitting, in response initiation of the access, the message to the target device through the short range wireless link.

11. The method of claim 10, further comprising:
  receiving, from the target device, acceptance of the request;
  creating, in response to receiving the acceptance, a messaging relay association with the target device; and
  transmitting to the messaging server, an indication of the messaging relay association.

12. The method of claim 10, further comprising:
  receiving, from the target device through the short range wireless link, a request to create the messaging relay association; and
  transmitting, to the target device, acceptance of the request.

13. The method of claim 12, further comprising:
  transmitting, to the target device through the short range wireless link in response to receiving the request, an indication of availability to be a host device configured to receive messages addressed to at least one target device to be transmitted to the target device in response to initiation of access to the target device.

14. The method of claim 10, further comprising transmitting, to a messaging server, an ability to serve as a host device.

15. The method of claim 14, further comprising determining the ability to serve as a host device based upon at least one of available storage space and remaining power pack energy.

16. The method of claim 10, wherein the initiating access is further in response to leaving the communications coverage area associated with the messaging server.

17. The method of claim 10,
wherein the short range wireless link comprises a Bluetooth communications subsystem, and
wherein the receiving is performed by a second communications subsystem that is different than the short range wireless link.

18. The method of claim 17, wherein initiating access comprises establishing a paired Bluetooth communication session with the target device.

19. A computer program product for hosting wirelessly relayed messages for a target device, the computer program product comprising:

a non-transitory computer readable storage medium having computer readable program code tangibly embodied therewith, the computer readable program code comprising instructions for:

receiving, from a messaging server, a message addressed for a target device, the target device being a different mobile wireless communication device;

storing the message;

initiating, subsequent to receiving the message and while not in a communications coverage area associated with the messaging server, a access to the target device through a short range wireless link;

transmitting, through the short range communication subsystem, a request to create a messaging relay association, the messaging relay association defining at least one target device and at least one host configured to receive messages addressed to the at least one target device to be transmitted to the target device in response to initiation of access to the target device;

determining a time of leaving communication with the messaging server;

determining a time of encounter with the target device corresponding to a time of establishing a short range wireless link through the short range communication subsystem with the target device;

transmitting along with the request a specification of a difference between the time of encounter and the time of leaving communication with the messaging server; and transmitting, in response to initiation of the access, the message to the target device through the short range wireless link.

\* \* \* \* \*